(12) United States Patent
Hill et al.

(10) Patent No.: US 6,256,648 B1
(45) Date of Patent: Jul. 3, 2001

(54) SYSTEM AND METHOD FOR SELECTING AND DISPLAYING HYPERLINKED INFORMATION RESOURCES

(75) Inventors: William Colyer Hill, Montville; Loren Gilbert Terveen, Basking Ridge, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/015,341

(22) Filed: Jan. 29, 1998

(51) Int. Cl.[7] .................................................... G06F 15/00
(52) U.S. Cl. ............................................................ 707/501
(58) Field of Search ................................. 707/516, 3–5, 707/500–515; 345/302

(56) References Cited

U.S. PATENT DOCUMENTS

| | | | | |
|---|---|---|---|---|
| 5,694,594 | * | 12/1997 | Chang | 707/6 |
| 5,855,015 | * | 2/2000 | Shoham | 707/5 |
| 5,875,446 | * | 2/1999 | Brown et al. | 707/3 |
| 6,018,342 | * | 1/2000 | Bristor | 345/354 |
| 6,029,195 | * | 2/2000 | Herz | 709/219 |

OTHER PUBLICATIONS

Pitkow, J. and Pirolli, P., Life, "Death, and Lawfulness on the Electronic Frontier," Mar. 22–27, 1997, pp. 383–390.

Baldonado, M.Q.W. and Winograd, T., "SenseMaker: An Information–Exploration Interface Supporting the Contextual Evolution of a User's Interests," Mar. 22–27, 1997, pp. 11–18.

Pirolli, P., Pitkow, J., and Rao, R., "Silk From a Sow's Ear: Extracting Usable Structures from the Web," Apr. 13–18, 1996, pp. 118–125.

Lamping, J., Rao, R., and Pirolli, P., "A Focus+Context Technique Based on Hyperbolic Geometry for Visualizing Large Hierarchies," May 7–11, 1995, pp. 401–408.

Mackinlay, J.D., Rao, R. and Card, S.K., "An Organic User Interface for Searching Citation Links," May 7–11, 1995, pp. 67–73.

Furnas, G.W., "Effective View Navigation," Mar. 22–27, 1997, pp. 367–374.

Pirolli, P., Schank, P., Hearst, M., Diehl, C., "Scatter/Gather Browsing Communicates the Topic Structure of a Very Large Text Collection," Apr. 13–18, 1996, pp. 213–220.

Card, S.K., Robertson, G.G., and York, W., "The WebBook and the Web Forager: An Information Workspace for the World–Wide Web," Apr. 13–18, 1996, pp. 111–117.

Mukherjea, S., Foley, J.D., and Hudson, S., "Visualizing Complex Hypermedia Networks Through Multiple Hierarchical Views," May 7–11, 1995, pp. 331–337.

(List continued on next page.)

*Primary Examiner*—Hosain T. Alam
*Assistant Examiner*—Alford W. Kindred
(74) *Attorney, Agent, or Firm*—Kenyon & Kenyon

(57) ABSTRACT

A set of seed resources S is received that is typically specified by a user. A set of discovered resources D is identified from a hyperlinked collection of resources C such that each resource in D is in a NK clan graph with respect to the set of seed resources S. An NK clan graph is the set of all resources that are in an N clan with at least K seeds. An N clan is a subgraph G of the hyperlinked collection of resources C such that every node in G is connected to every other node in G by a path of length N or less, and the connecting paths traverse only nodes in the subgraph G. The set of discovered resources D is added to the set of seed resources S. At least some of the resources in subgraph G are displayed to the user to convey information about resources in G as well as the relationship between these resources.

30 Claims, 6 Drawing Sheets

OTHER PUBLICATIONS

Botafogo, R.A., Rivlin, E., and Shneiderman, B., "Structural Analysis of Hypertexts: Identifying Hierarchies and Useful Metrics," Apr. 1992, pp. 142–180.

Resnick, P. and Varian, H.R., *Communications of the ACM*, Special issue on "Recommender Systems," Mar. 1997.

Garfield, E., *Citation Indexing*, "ISI Press," 1979.

Hill, W.C., Stead, L., Rosentein, M. and Furnas, G., Proceedings of CHI '95, Recommending and Evaluating Choices in a Virtual Community of Use, May 1995, pp. 194–201.

Jackson, M.H., *Journal of Computer–Mediated Communication*, "Assessing the Structure of Communication on the World Wide Web," Jun. 1997.

Kandogan, E. and Shneiderman. B., Proceedings of UIST '97, "Elastic Windows: A Hierarchical Multi–Window World–Wide Web Browser."

Mukherjea, S. and Foley, J.D., *Computer Networks and ISDN Systems*, "Visualizing the World–Wide Web with the Navigational View Finder," 1995, pp. 1075–1087.

Scott, J., *Social Network Analysis: A Handbook*, 1991.

Terveen, L.G., Hill, W.C.,Amento, B., McDonald, D. and Creter, J., Proceedings of CHI '97, "Building Task–Specific Interfaces to High Volume Conversational Data," Mar. 1997, pp. 226–233.

* cited by examiner

FIG. 4

```
        29 ROAR sites related to your examples
        401
       ┌──↙──────────────┐
1.     │ THE SANCTUARY   │  25 sites linked with this site
       └─────────────────┘

2.  THE Roarior!   19 sites linked with this site

3.  ROAR!  *input*  17 sites linked with this site

4.  Rrrrrrooooaaarrr!  *input*  24 sites linked with this site

5.  KGskidz/Personal WBS Home Pa...  ┌──────────────────────────────┐
                                     │ 22 sites linked with this site│╲ 402
                                     └──────────────────────────────┘

6.  Hear the ROAR  *input*  21 sites linked with this site

7.  ROAR: The Fight For Freedom  *input*  11 sites linked with this site

8.  Universal Studios  *input*  9 sites linked with this site
                                          sites linking to this url
    ┌─────────────────────────────────┐
    │ ROAR (UNIVERSAL TELEVISION)  8  │
    └─────────────────────────────────┘╲
         12 more URL(s) linked at once   403

9.  Members.tripod.com/~tshy/roar/...  9 sites linked with this site

10. FOXWORLD  8 sites linked with this site
             sites linking to this url
    Roar  8
    1 more URL(s) linked at once 11. Hear the ROAR  *input*  8 sites linked with this site 12. TV GUIDE ENTERTAINMENT NETWORK  7 sites linked with this site
                        sites linking to this url
    Area 52: Q&A        4
    bbs/answers2.htm    2
    1 more URL(s) linked to once 13. members.aol.com/conorroar  4 sites linked with this site 14. Can you hear the ROAR?  11 sites linked with this site 15. Roar Resource Page  11 sites linked with this site 16. Roar!  9 sites linked with this site 17. Since I'm not with Universal,...  8 sites linked with this site
```

SYSTEM AND METHOD FOR SELECTING AND DISPLAYING HYPERLINKED INFORMATION RESOURCES

FIELD OF THE INVENTION

The field of the invention is locating and displaying information resources from a hyperlinked collection of such resources, and in particular using information about relationships between resources to efficiently identify and display resources relevant to a topic or topics.

BACKGROUND OF THE INVENTION

The World Wide Web (WWW) is a networked collection of hyperlinked documents available over the Internet. The WWW exemplifies the problem of meaningfully selecting information resources that pertain to a given topic. In particular, users need a way to manage information pertaining to lasting interest in a broad topic, and to find a way to render vast collections of resources pertaining to such a topic comprehensible. Search engines and indices such as Yahoo! are the most widespread solution attempts (see http://www.yahoo.com, visited Jan.26, 1998).

A resource is an embodiment of information or an embodiment of a collection of information. Examples of resources include files, text documents, multimedia documents, a hyperlinked file (such as a web page), and a collection of hyperlinked files (such as a web site, or simply "site").

Known techniques that address the problem of selecting information resources from a large collection thereof typically raise the level of abstraction at which users interact with the large collection. Researchers have sought to define useful, higher-level structures that can be extracted from hypertext collections, such as "collections", "localities", "patches" or "books." See Pitkow, J. and Pirolli, P., Life, "Death, and Lawfulness on the Electronic Frontier," Mar. 22–27, 1997, pages 383–390; Pirolli, P., Pitkow, J., and Rao, R., "Silk From a Sow's Ear: Extracting Usable Structures from the Web," Apr. 13–18, 1996, pages 118–125;and Card, S. K., Robertson, G. G., and York, W., "The WebBook and the Web Forager: An Information Workspace for the World-Wide Web," April 13–18, 1996, pages 111–117. This approach opens up four major avenues of innovation: definitions of new structures, algorithms to extract the structures, visualization techniques that enable users to comprehend the structures, and interface techniques that create a workspace in which it is easy to specify, modify, and experiment with the structures.

Pitkow and Pirolli report cluster algorithms based on co-citation analysis. See Pitkow, J. and Pirolli, P., Life, "Death, and Lawfulness on the Electronic Frontier," Mar. 22–27, 1997,pages 383–390. See also Garfield, E., *Citation Indexing,*"ISI Press," 1979. The intuition is that if two documents, say A and B, are both cited by a third document, this is evidence that A and B are related. The more often a pair of documents is co-cited, the stronger the relationship. They applied two algorithms to Georgia Tech's Graphic Visualization and Usability Center web site and were able to identify interesting clusters.

Card, Robertson, and York describe the WebBook, which uses a book metaphor to group a collection of related web pages for viewing and interaction, and the WebForager, an interface that lets users view and manage multiple Web-Books. See Card, S. K., Robertson, G. G., and York, W., "The WebBook and the Web Forager: An Information Workspace for the World-Wide Web," Apr. 13–18, 1996, pages 111–117. They also present a set of automatic methods for generating such collections of related pages, such as recursively following all relative links from a specified web page, following all (absolute) links from a page one level, extracting "book-like" structures by following "next" and "previous", and grouping pages returned from a search query.

Pirolli, Pitkow, and Rao defined a set of functional roles that web pages can play, such as "head" (roughly the "front door" of a group of related pages), "index", and "content". See Pirolli, P., Pitkow, J., and Rao, R., "Silk From a Sow's Ear: Extracting Usable Structures from the Web," Apr. 13–18, 1996, pages 118–125. They then developed an algorithm that used hyperlink structure, text similarity, and user access data to categorize pages into the various roles. They applied these algorithms to the Xerox web site and were able to categorize pages with good accuracy.

Mackinlay, Rao, and Card developed a novel interface for accessing articles from a citation database. See Mackinlay, J.D., Rao, R. and Card, S.K., "An Organic User Interface for Searching Citation Links," May 7–11, 1995, pages 67–73. The central user interface object is a "butterfly", which represents one article, its references, and its citers. The interface makes it easy for users to browse from one article to a related one, group articles, and generate queries to retrieve articles that stand in a particular relationship to the current article.

Mukherjea et al. (Mukherjea, S., Foley, J. D., and Hudson, S., "Visualizing Complex Hypermedia Networks Through Multiple Hierarchical Views," May 7–11, 1995,pages 331–337) and Botafogo et al. (Botafogo, R. A., Rivlin, E., and Shneiderman, B., "Structural Analysis of Hypertexts: Identifying Hierarchies and Useful Metrics," April, 1992, pages 142–180) report on algorithms for analyzing arbitrary networks, splitting them into structures (such as "pre-trees" or hierarchies) that are easier for users to visualize and navigate.

Other efforts propose novel ways to view and navigate information structures. The Navigational View Builder combines structural and content analysis to support four viewing strategies: binding, clustering, filtering and hierarchization. See Mukherjea, S., Foley, J. D., and Hudson, S., "Visualizing Complex Hypermedia Networks Through Multiple Hierarchical Views," May 7–11, 1995, pages 331–337. Through the extensive use of single user operations on multiple windows, the Elastic Windows browser provides efficient overview and sense of current location in information structures. See Kandogan, E. and Shneiderman, B., Proceedings of UIST '97, "Elastic Windows: A Hierarchical Multi-Window World-Wide Web Browser." Lamping et al. explored hyperbolic tree visualization of information structures. See Lamping, J., Rao, R., and Pirolli, P., "A Focus+ Context Technique Based on Hyperbolic Geometry for Visualizing Large Hierarchies," May 7–11, 1995, pages 401–408. A product called "twURL" helps users view and manage collections of URLs, organizing URLs into outlines based on properties such as server, domain, and number of incoming links. See "What is twURL?" http://www.roir.com/whatis.htm. Furnas presents a theory of how to create structures that are easy for users to navigate. See Furnas, G. W., "Effective View Navigation," Mar.22–27, 1997, pages 367–374.

Somewhat less directly related are the SenseMaker and Scatter/Gather systems. See Pirolli, P., Schank, P., Hearst, M., Diehl, C., "Scatter/Gather Browsing Communicates the Topic Structure of a Very Large Text Collection," Apr.

13–18, 1996, pages 213–220. SenseMaker supports users in the contextual evolution of their interest in a topic. The focus is on making it easy for users to view and manage the results of a query and to create new queries based on the existing context. Scatter/Gather supports the browsing of large collections of text allowing users to iteratively reveal topic structure and locate desirable documents.

Purely structural analysis of known techniques can be somewhat useful, but such techniques used for the WWW concentrate on links between pages, while ignoring the fact that numerous pages are related to each other (e.g., they belong to the same group of pages called a "site"). This ignores critical contextual and/or functional information about the web pages that can be valuable in helping the user interact intelligently with on-topic information on the WWW. The functional roles a web page can play should also be taken into account in solving this problem.

Most known WWW techniques either take a base collection of pages as given (often all the web pages rooted at a particular URL like www.xerox.com), or focus on methods for supporting users in creating base collections. A base collection can be thought of partly as a starting point for gathering information on a topic. For example, a user can identify several key web sites or articles that are highly pertinent to a topic of interest as the base collection. As used herein, the term "seed document" refers to a resource in a base collection. The base collection is referred to as the "seed set." Some automated techniques for creating WWW seed sets are known, but the basic unit out of which the sets are built is a single web page. Thus, the resulting sets are local, and do not generally take into account the larger collection of resources (e.g., the entire WWW) of which they are typically a part. Indeed, some known techniques are limited to more or less a single site. A more global solution that encompasses more far-flung information is needed. Another important problem is that large collections of hyperlinked resources such as the WWW often consist of many ecologies of dynamic, evolving documents. Any technique for selecting topic-relevant resources from such a collection should maintain an acceptable level of accuracy in such an environment.

SUMMARY OF THE INVENTION

The present invention efficiently selects a set of resources that pertain to a given topic from a large collection of hyperlinked resources based upon a seed set that is typically defined by a user. A seed set is a set of information resources (e.g., websites) typically selected by a user that all relate to a topic in which the user is interested. The selected resources are advantageously displayed in a way that is easily comprehensible and conveys a substantial amount of information about the content and relationships between the selected sites. The present invention achieves this by defining a new information structure called a "local clan graph." The local clan graph has nodes that represent information resources (e.g., websites) and lines connecting the nodes. The lines represent hyperlinks between the information resources. The nodes of a local clan are linked to at least K resources in the seed set by paths no longer than N links.

Also, to enable users to comprehend and manage the information we extract, the present invention includes visualization techniques that communicate key information, such as whether a site is structurally central or peripheral, whether a site is more of a content provider or index, important internal structure of a site, and how sites link together.

By supplying appropriate seeds and relevance feedback, users work with the system to construct a collection that better matches their interest in a topic than known information management systems for hyperlinked collections of information. The present invention can also be used to view previously constructed collections, so that anyone interested in a topic can benefit from the work of those who care enough to construct collections. Embodiments of the present invention have been implemented in Java. The present invention can advantageously be implemented in a variety of other programming languages. The WWW is discussed herein only as an example of an application of the present invention, and is not meant to describe the only such application. The present invention can be implemented to select on-topic resources from any collection of hypertext linked resources.

BRIEF DESCRIPTION OF THE DRAWINGS

FIG. 4 shows an embodiment of a portion of a clan graph as an ordered list in accordance with the present invention.

DETAILED DESCRIPTION

Figure 1A:
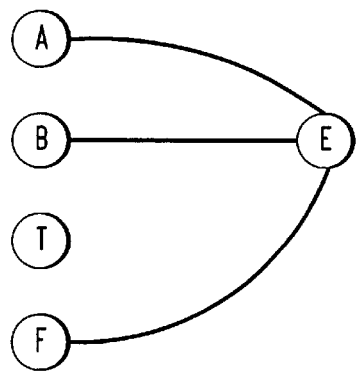
FIG. 1a shows an example of a resource in a clan graph.

A clan graph is a directed graph, where nodes represent content objects (such as documents), and an edge from one node to another represents a citation of or reference to the contents of the target node by the source node. As used herein, a "universal graph" is the graph of all nodes and edges of a collection of hyperlinked information resources. An example of a universal graph is a hyperlinked collection of sites and/or files such as the WWW. Another example of a universal graph is a bibliographic database in which the information resources are documents or articles. The documents and articles correspond to nodes in a universal graph, while the citations between documents and articles in the collection correspond to links or relationships between the nodes. A universal graph is also referred to herein as a "hyperlinked collection of resources C." An example of a universal graph is the entire collection of websites on the WWW.

A "topic graph" is a subgraph of the universal graph that contains sites on the same or similar topics. This is an ideal construct that can only be approximated, e.g., through analysis of structure of similarity of content. An example of a topic graph is a graph whose nodes are every website on the WWW that pertains to the topic, "ER." A topic graph is ideal not only because it is often practically unattainable, but because it would be ideal to provide the user with a complete picture of all of the resources in the universal set that pertain to the topic in which the user is interested. One way of constructing a topic set would be to have the user examine all of the resources in the universal graph (e.g., all of the web sites in the WWW) and decide which pertain to the user's topic. Of course, this is impractical for large universal sets such as the WWW, and thus a more expedient, if approximate, way is needed to select a set of resources about a topic from a large collection of resources.

A local clan graph is an approximation to the topic graph in accordance with the present invention. It represents a kind of "best effort" to obtain as good a picture of the topic graph as possible, using a method that starts with a seed set provided by a user. The method includes applying the definition of the local clan graph to candidate resources that are initially derived from the seed sites, and then generated from the candidate resources themselves. The local clan graph definition is advantageously structured so that resources that are determined to fall in the clan graph under the definition are likely to pertain to the same topic of the seed sites. More formally, a local clan graph (also called a "local graph" or "clan graph") for a specified set of seed resources (also called "seed sites") is the subgraph of the universal graph whose nodes are the seed sites or are closely connected to the seeds, and whose edges are just those between the included nodes. The local clan graph is the product of the method in accordance with the present invention by which a topic graph is defined. An example of a clan graph of the ER seed set discussed above where K=3 and N=2 includes 14 sites, each of which is connected to at least 3 of the ER seed sites either directly, or through at most one other site in the ER clan graph.

Just as a topic graph can be difficult or impossible to obtain, a true local clan graph can also be difficult to obtain in practice, although for mostly different reasons. This is because in practice, information about resources and relationships between resources can be imperfect because certain resources may be unavailable for analysis, and information about resources and relationships may change more rapidly that can be assimilated. For example, the WWW is huge and trying to fetch all the pages on a site and to follow all the links off a site can take an impractical amount of time. Also, access to the WWW is unreliable, as some sites are down, or network trouble prevents access to certain sites. Also, the WWW is constantly changing, so the universal and local graphs are moving targets. Thus, a user must take what the user can get in practice in constructing the local clan graph. The resulting graph is called an "observed graph," and represents an approximation to the local clan graph. Both the local clan graph and the observed graph is a subgraph G of a hyperlinked collection of resources C.

The clan graph has clear intuitive motivation based on concepts from social network analysis, social filtering, and co-citation analysis. It is easy for users to specify seeds, e.g., they may get them from their bookmarks file, from an index page they found on the WWW, or from a search engine. As discussed below, our definition is advantageously tolerant of "noise" in the seeds: a few off-topic seeds will not affect the quality of the resulting clan graph.

For the WWW, we have found that it is more useful to use a site as a resource than a web page. This can also apply to other collections of resources, where sets of individual resources (e.g., a structured collection of pages, a multimedia document) are more usefully treated as fundamental units (e.g., nodes in the local clan graph) than would be the individual resources themselves. Such a set usually contains a coherent body of content on a given topic (e.g., song lyrics, episode guides for a TV show, current weather conditions), that can be divided into individual units (e.g., pages). As used herein, the term "site" means a set of coherent resources, or alternatively, a single resource that can be separated into more or less discrete, self-contained parts. On the WWW, most hyperlinks to a site point to a "front door" page, while most links from a site come from an "index page" that is typically meant to refer the user to other resources in the collection identified by the owner of the site as pertinent to the site's topic. The present invention harnesses these references in obtaining leads to other on-topic resources in the large collection from, for example, index pages in web sites that are seed sites, or else in web pages obtained from web seed sites.

A local clan graph defines a set of relevant resources D from a large collection of resources C based upon the hyperlinks found in seed resources belonging to a seed set that is typically user-defined. An example of a seed set are principal sites concerning a topic found by performing a keyword search using a search engine on the WWW. For example, consider the topic "ER", a medical drama broadcast on television. A query "ER" was submitted to the Yahoo! search engine on Jan. 29, 1998. The results included the following links (URLs not shown):

Amazing ER Stories - jokes and funny stories about ER episodes

ER Live.com - enhanced site with chat events, streaming video, special video interviews and more to celebrate the live broadcasts of ER Submit ER script idea - The technical advisors of ER have expressed an interest in obtaining story ideas from emergency physicians. Submitted story ideas here will be forwarded to a physician writer associated with the show. NBC: ER These sites could serve as a seed set for the topic "ER." Each of these sites include pages that have links to other pages within the site and to other sites. These links can be evaluated in accordance with the present invention to discover other sites not found by the search engine that are relevant to the topic "ER" and possibly of interest to a user.

Figure 1B:
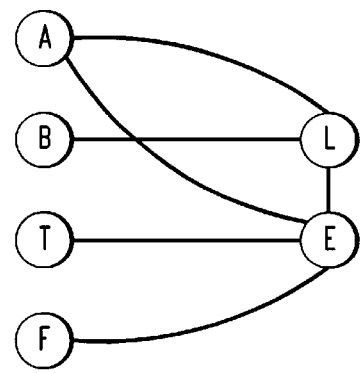
FIG. 1b shows another example of a resource in a clan graph.
Figure 1C:
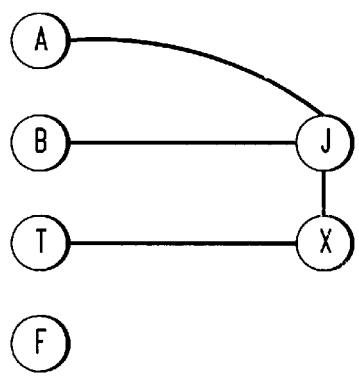
FIG. 1c shows an example of a resource that is not in a clan graph.

The relevant resources are defined to be those resources that are no more than N links away from at least K resources in the seed set, and all of the resources that are intermediate links between a given resource and a seed resource are also in the local clan graph. For example, as shown in FIG. 1a, suppose documents A, B, T and F are in the seed set, and N is equal to 2 and K is equal to 3. A node in the graph represents a resource, and a line in the graph represents a link. If a document E is linked to directly from A, B and F, then it is in the local clan graph D. Likewise, as shown in FIG. 1b, if a document L is linked to directly from A and B, and is linked to directly from E (which is linked to directly from A, B and F), then L is in the local clan graph. As shown in FIG. 1c, note that if a resource J is linked to directly to two resources A and B in the seed set, and to a third resource T in the seed set through a resource X that is not in the local clan graph (e.g., because it is linked only to T), then resource J is not in the local clan graph. In other words, when a resource J is linked to at least K resources in the seed set in no more than N jumps, each of any intermediary resources through which J is connected to a seed resource must also be in the local clan graph in order for J to be in the seed set. In accordance with the present invention, N and K can be any integers. A set of resources discovered to be in the local clan graph are added to the seed set.

For a more concrete example, consider the topic "ER." A resource is a web site. Suppose a user selects four of links described above as being the most relevant (e.g., the most interesting), designating the four ER sites described above as constituting a seed set for the topic "ER." Each of these resources (web sites) can be represented as a node in a graph. Any link between them can be represented as a line. For example, a link between Amazing ER Stories and the official web site NBC:ER can be represented as a line between a node corresponding to the Amazing ER Stories site and a node corresponding to NBC:ER site.

Each of the sites in the above seed set are composed of pages. Many of these pages have links to other resources besides those listed above. For example, three of the sites in the above seed set may have pages with links to directly another site called the "ER Actor Bio"site, which describes the backgrounds of the cast of ER. The ER Actor Bio site is called a candidate site, and is evaluated to determine if it is in a local clan graph with respect to the seed sites. The ER Actor Bio is indeed in a local clan graph with respect to the seed sites for certain values of N and K, e.g., for N=1 and K=3, for N=2 and K=2, etc. This demonstrates one role of the variable K. Increasing K increases the number of seed sites to which a candidate site must be linked in order to be in the clan graph. Thus, only more sites more intensively referenced by the seed sites fall into the clan graph. More intensively referenced sites are generally more likely to contain information that is on the topic of the seed sites.

The ER Actor Bio site is itself composed of pages, many of which have links to other pages. These links are evaluated to determine if the resources to which they link (e.g., web sites) also fall in the local clan graph. Consider a local clan graph where N=2 and K=3. Suppose the ER Actor Bio links to a site called the "ER Advertiser Site" that contains information about the products promoted by sponsors of ER. The ER Advertiser Site in the local clan graph for N=2 and K=3 because it is within two links of the three seed sites to which the ER Actor Bio site is linked. This shows that the variable N determines the maximum remoteness of a site from the seed sites. A lower value for N forces a candidate site to be closer to the seed sites in order for the candidate site to fall into the clan graph. Sites that are closer to the seed sites can be more likely to contain information on the same topic as the seed sites.

The goal is to find the local clan graph for a set of seed sites. Formally, the NK local clan graph for a seed set S is $\{(v,e)|$ v is in an N-clan with at least K members of S$\}$. An N-clan is a graph where (1) every node is connected to every other node by a path of length N or less, and (2) all of the connecting paths only go through nodes in the clan. It is especially advantageous to consider 2-clans, that is, the 2K local clan graph, although the present invention encompasses any value for integer N. The local clan graph is a key element of the present invention that represents a useful substructure to extract from a large network.

An example of a universal graph is the collection of sites on the WWW. On the WWW, a site is an organized collection of pages, typically on a specific topic, often maintained by a single person or group. Sites have structure, with pages that play certain roles (front-door, table-of-contents, index). A site is not the same thing as a domain: for example, suppose that thousands of sites are hosted on a host operated by a university and located at www.xyz.com. Further, what constitutes a site may be context dependent. For example, if one is taking a survey of research labs, www.media.mit.edu might well be considered a site, while if one is investigating social filtering projects, individual researchers' sites hosted on www.media.mit.edu are probably the proper units.

The last observation suggested a way to operationalize the definition of a site. When building a clan graph, the relevant known context is the set of Uniform Resource Locators (URLs) that have been linked to by the expanded sites. The intuition is that if sites in the clan graph link to two URLs, one of which is in a directory that contains the other, then they are likely to be from the same site. The notions of site and clan graph are interdependent: a site is defined in terms of links from within the graph, and the graph is constructed by following links from sites. More precisely: if URL A has been linked to and URL A/B has been linked to, then we assume that A is the root page of the site and that A/B is an internal URL. This rule applies recursively, so the URLs A/B/C, A/B, and A would be merged into a site with root page A and internal pages A/B and A/B/C.

This rule can fail. For example, two URLs that belong to the same site will not be merged if no common ancestor in the directory structure (the "real" root page) has been linked to, and two URLs from distinct sites can be merged, (e.g., if there are links to two distinct sites hosted on www.xyz.com and to www.xyz.com itself). Hence, this rule can advantageously be modified in accordance with the present invention based on the idea that when some "internal" pages are linked to significantly more often than is the (supposed) root page, then the heavily linked-to internal pages may be separate sites. Further, if (supposedly) distinct sites point to many of the same pages in the same domain, they may be part of the same site.

Determining whether a link from a page is within the site or to another site can provide valuable contextual information about the link and the page from which it links. For example, a page with many links to other pages is likely to be an index page that contains a list of other resources in the collection pertinent to the topic of the site in which the index page occurs. Links are classified based on their relationship to the root page of the site. If a link is contained within the directory that contains the root page, then it is classified as "internal", i.e., it is a page that belongs to the site to which the root page belongs. Otherwise, it is classified as a link to an external site. Internal links can be added to a site-internal set of candidate pages to be fetched.

It is also important to specify how many pages to fetch from a site, i.e., what it means to expand the site. The primary reason for fetching pages is to find links to other sites, which are the building blocks of the clan graph. For this purpose, finding a site's index page presumably would yield most or all such links, so one could then stop expanding the site. Indeed, index pages are sought first by sorting pages on the site-internal queue by name, preferring pages whose names contain words like "links", "pages", "sites", "web", and "internet" (both plural and singular). And after a page is fetched, its title, the number of external links, and/or the ratio of external links to the page size can be analyzed to judge whether it really is an index page.

However, there is another reason to fetch pages, namely to build a profile that can be used to evaluate a site. Factors like site size (in pages) and amount of content (text, images, audio files) are important. The more pages are fetched, the more accurate a site profile can be created.

To serve both goals, there are two parameters to control site expansion, P(min) and P(max). In accordance with an embodiment of the present invention, at least P(min) pages are always fetched from a site. If a page has been found that is thought to be an index page by the time P(min) pages have been fetched, no further pages are fetched. Otherwise, pages continue to be fetched until either an index page is found, or P(max) pages have been fetched.

The definition of the clan graph in accordance with the present invention provides a way for determining if resources are related. Known techniques such as co-citation analysis state that documents B and C are related if A cites them both. Social filtering techniques hold that if documents B and C both refer to A, then B and C may be likely to link to similar sorts of items in general, and thus deal with similar topics. A limited (2-edge) transitivity applies in that if C is on a particular topic, and cites A, then A is likely to be on that topic; and if A cites B, then B is likely (though somewhat less so) to be on the same topic.

These three relationships are called the minimal 2-clans. They show why 2-clans are one appropriate way to represent topically related subgraphs of items in a larger graph. 2-clans are appropriate because no smaller structures can be used to make inferences about document relatedness, and they are sufficient because they enable other simple inferences.

Note that 2-clans are defined over undirected graphs. In other words, A and B are considered to be connected whether A links to B or vice versa. This is appropriate because we have observed many sites that are topically central (i.e., highly relevant to the selected topic) but that have only in-links (links from other sites) or out-links (links to other sites.) Sites with predominantly in-links are typically content sites. Sites with predominantly out-links are typically index sites. A measure that required bi-directional paths between nodes would likely underrate some important sites. Therefore, once undirected connectivity is established, subsequent analysis takes directionality into account in order to identify important structures like sinks and sources.

The 2-clan definition avoids the use of an arbitrary graph density parameter (density is the proportion of actual links in a graph to the maximum possible number of links). This is because it can be difficult or impossible to specify a meaningful density threshold for a graph.

By requiring that sites be related to a certain number of seeds, the present invention ensures that not just dense graphs are found, but graphs in which a certain number of the seeds "participate" are found. Since at least most of the seeds pertain to a specific topic, this is a way to stay on-topic, and is one way in which a "triangulation" effect is made operational. Making K larger is a simple way to get smaller, more tightly connected graphs. This usually means that the sites in the graph are more likely to be both on-topic and central (highly relevant) to the topic.

The method in accordance with the present invention efficiently constructs an observed graph that at least well approximates the local graph. The observed graph obtained depends on the properties of the initial seed sites. Our experience is that users are able to choose good seeds. Good seeds have three properties. First, the seed set should cohere: if the seed sites have few outgoing links or link to few of the same sites, the observed clan graph will be small. This implies that the seeds do not participate in a significant dense subgraph within the universal graph. Second, the seeds should cover the topic: a poorly chosen seed set may lead to an observed graph that is a small subset of the topic subgraph. This can be the case if there are too few seeds, or the seeds are not well distributed across components in the topic graph. Finally, the seeds should be accurate: if some of the seeds are off-topic, then the clan graph may contain off-topic sites. However, if most of the seeds are on-topic, this is advantageously not a problem in accordance with the present invention. The parameter K plays an important role here because any site added to the graph should be in a 2-clan with at least K seeds. As long as fewer than K off-topic sites are themselves related, sites to which they link will not reach above this threshold.

Figure 1D:
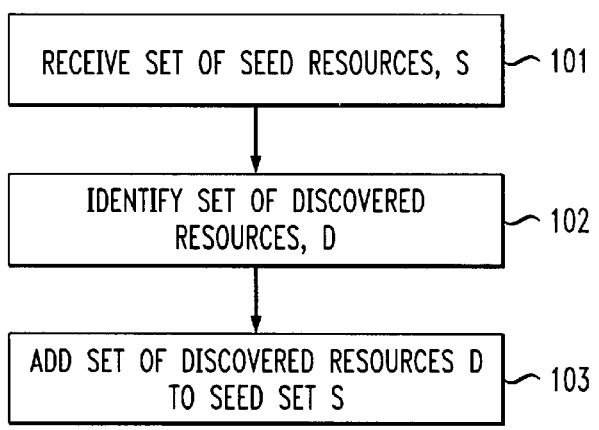
FIG. 1d shows an embodiment of the method in accordance with the present invention.

An embodiment of the method in accordance with the present invention is shown in FIG. 1D. A set of seed resources S is received, step 101. The seed resources in S are typically selected by a user. A set of discovered resources D is identified from a hyperlinked collection of resources C such that each resource in D is in a NK clan graph with respect to the set of seed resources S, step 102. As described above, an NK clan graph is the set of all resources that are in an N clan with at least K seeds. An N clan is a subgraph G of the hyperlinked collection of resources C such that every node in G is connected to every other node in G by a path of length N or less, and the connecting paths traverse only nodes in the subgraph G. This last constraint guarantees that any resource through which other resources are connected by a path length of N or less is also a member of G. The discussion above particularly describes the use of 2-clans (i.e., N=2). However, the present invention is not limited to N=2; it encompasses all values of N. The description of embodiments using the 2-clan are merely exemplary. The set of discovered resources D is added to the set of seed resources S, step 103.

Figure 2:
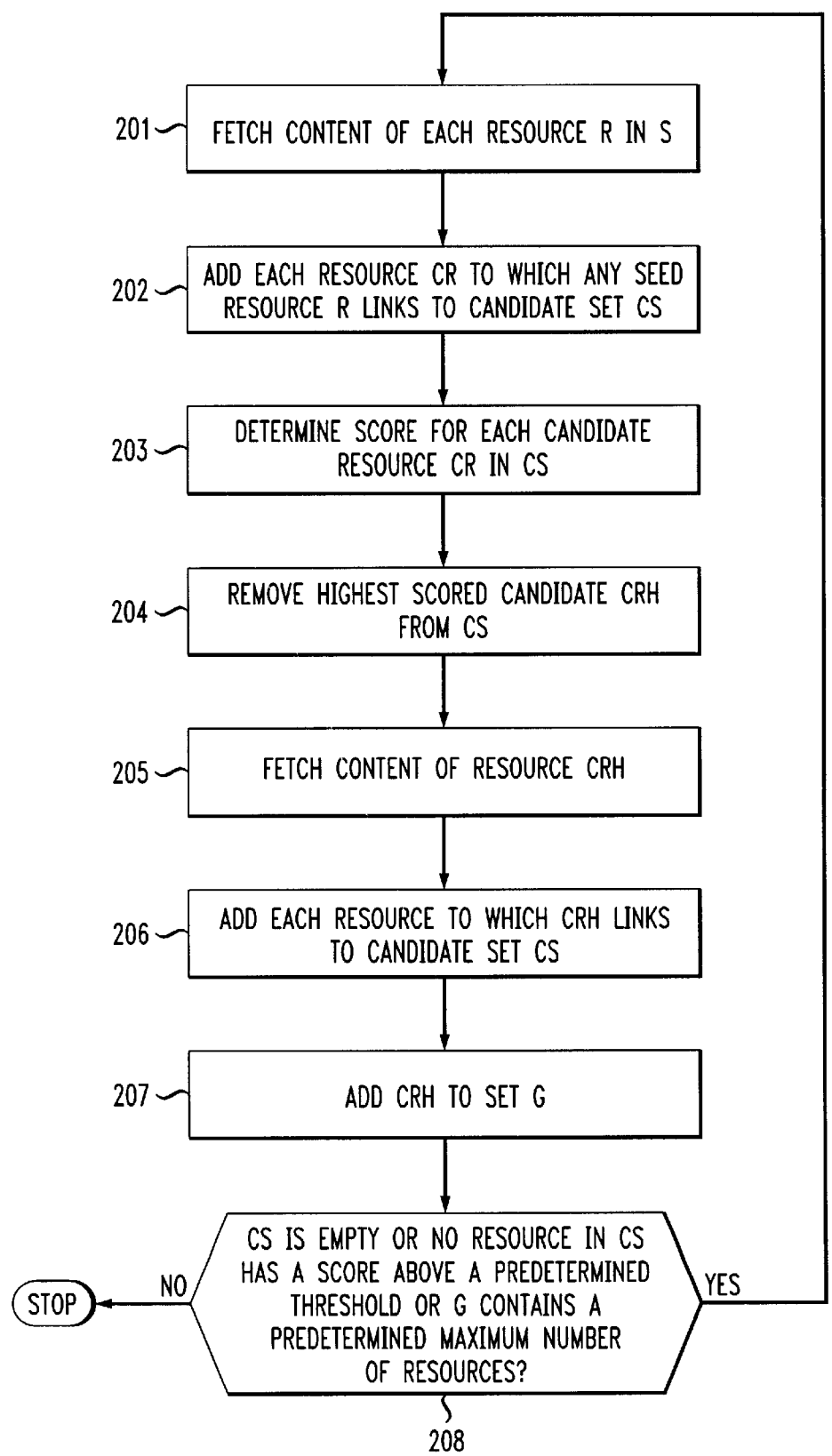
FIG. 2 shows an embodiment of the method in accordance with the present invention for identifying discovered resources.

An embodiment of the method in accordance with the present invention is shown in FIG. 2. The content of each seed resource R in S is fetched, step 201. Each resource CR to which any seed resource R links is added to a candidate set CS, step 202. A score is determined for each candidate resource CR in CS, step 203. The score relates to the likelihood that a candidate resource is related to seed sites. The highest scored candidate CRH is removed from CS, step 204. The content of CRH is fetched, step 205. Each resource to which CRH links is added to CS, step 206. CRH is added to G, step 207. Steps 201 through 207 are repeated until either CS is empty or no resource in CS has a score that is above a specified threshold or G contains a predetermined maximum number of resources, step 208.

A scoring metric is needed that estimates the likelihood that a resource is in the local graph G with the seed sites, e.g., that it is in a 2-clan with at least K seeds. The metric is needed to appropriately select the more relevant resources from a set of candidate resources to add to the seed set. The metric should be efficient to compute, since it should be applied to each resource in the candidate set, and the candidate set typically contains hundreds or thousands of resources. One embodiment of the present invention uses the following scoring metric: the score of site S=the number of seed sites that are linked to S by paths of length 2 or less. This metric is a reasonable heuristic, since 2-clans are composed of 1 and 2-paths, and is therefore fairly cheap to compute. Other scoring metrics can also be used in accordance with the present invention.

After constructing a clan graph, it can be analyzed in accordance with the present invention to advantageously extract additional structure to aid user comprehension. Structural properties of sites are determined. For example, the number of 2-clans of which a site is a member and the number of in- and out-links are determined for each site. Combining this structural information with site profile data like size (in pages) and the amount and type (text, audio files, images) of content makes it possible to distinguish "official" sites (for a TV show, for example), which tend to have lots of content and in-links and few or no out-links, from index sites, which tend to have little content and lots of out-links. Thus, users do not get stuck following links from one index site to another, never getting to the content that they really want.

Internal pages of a site to which multiple external sites have linked are also identified. By providing direct access to these pages, "shortcuts" are advantageously created to places the topic community found worth endorsing. These can be considerable aids to navigation.

The text associated with the hyperlinks to each site is also analyzed. Much of the time, the text is either the site title or a close variation. However, sometimes the text is a useful alternative description of the usefulness of the site.

Figure 3:
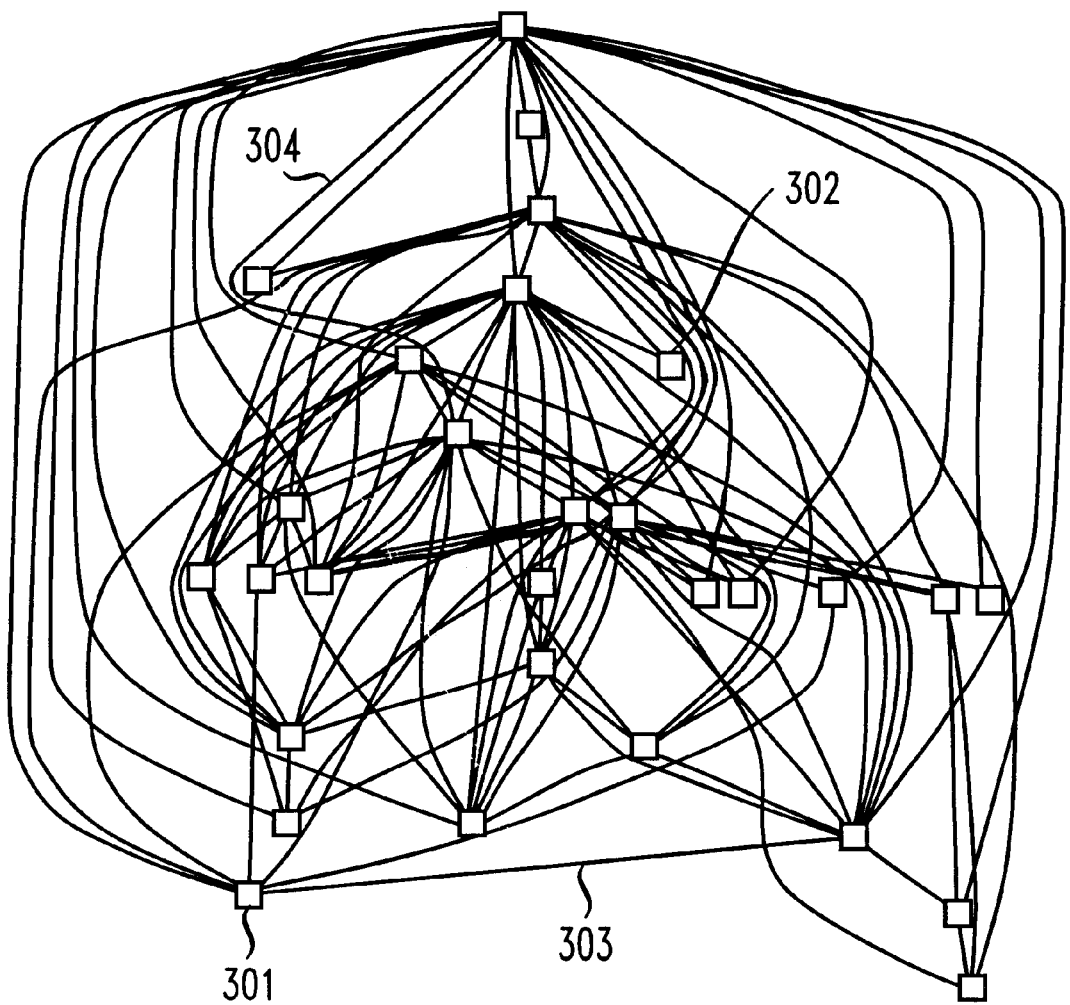
FIG. 3 shows an embodiment of a direct node/edge representation of a clan graph in accordance with the present invention.

The structure of clan graphs that have been observed in the WWW is complicated and can be difficult to visualize or understand. For example, FIG. 3 shows a direct node/edge representation of the clan graph for the Television show "Roar" observed in August of 1997.Nodes are represented by blocks, e.g., 301 and 302. Edges are represented by lines, e.g., 303 and 304. The drawing was produced by a sophisticated graph layout tool, dot, which minimizes edge crossings, yet the drawing remains complicated. The clutter of edge crossings, edge angles and local node constellations divert visual attention to non-significant graphic elements. A viewer can identify some nodes of high and low degree, but the layout reveals no overall pattern. It is virtually impossible to visually discern central and peripheral sites.

For the purpose of revealing node degree, simply collapsing the graph structure into a list of nodes ordered by degree is a better interface. FIG. 4 shows a portion of a clan graph as an ordered list. The ordered list form of FIG. 4 makes it easy for users to compare node degree and check quantities. The ordered list shows a label describing each site, e.g., 401. It also shows link information for each site, e.g., 402. Note that the eighth site in the list ("Universal Studios") contains substructure, i.e., an internal page 403 that was linked to by multiple sites. The list view is quick and easy to produce but still hides many important properties of sites and the graph. The list view is linear, so it easily communicates only one dimension. It is textual, so it cannot exploit graphical display properties, either images from the sites or the use of color, position, shape, etc. to communicate site properties. It is static, so there is no dynamic focusing, and no hiding and revealing of structure.

Users can also see the results of clan graph analysis of the present invention in terms of the graph itself. These results include structural centrality, as measured by the number of 2-clans of which a site is a member, the number of in-links, the number of out-links, and content properties such as the number of images, audio, video, and text files at a site.

Figure 5:
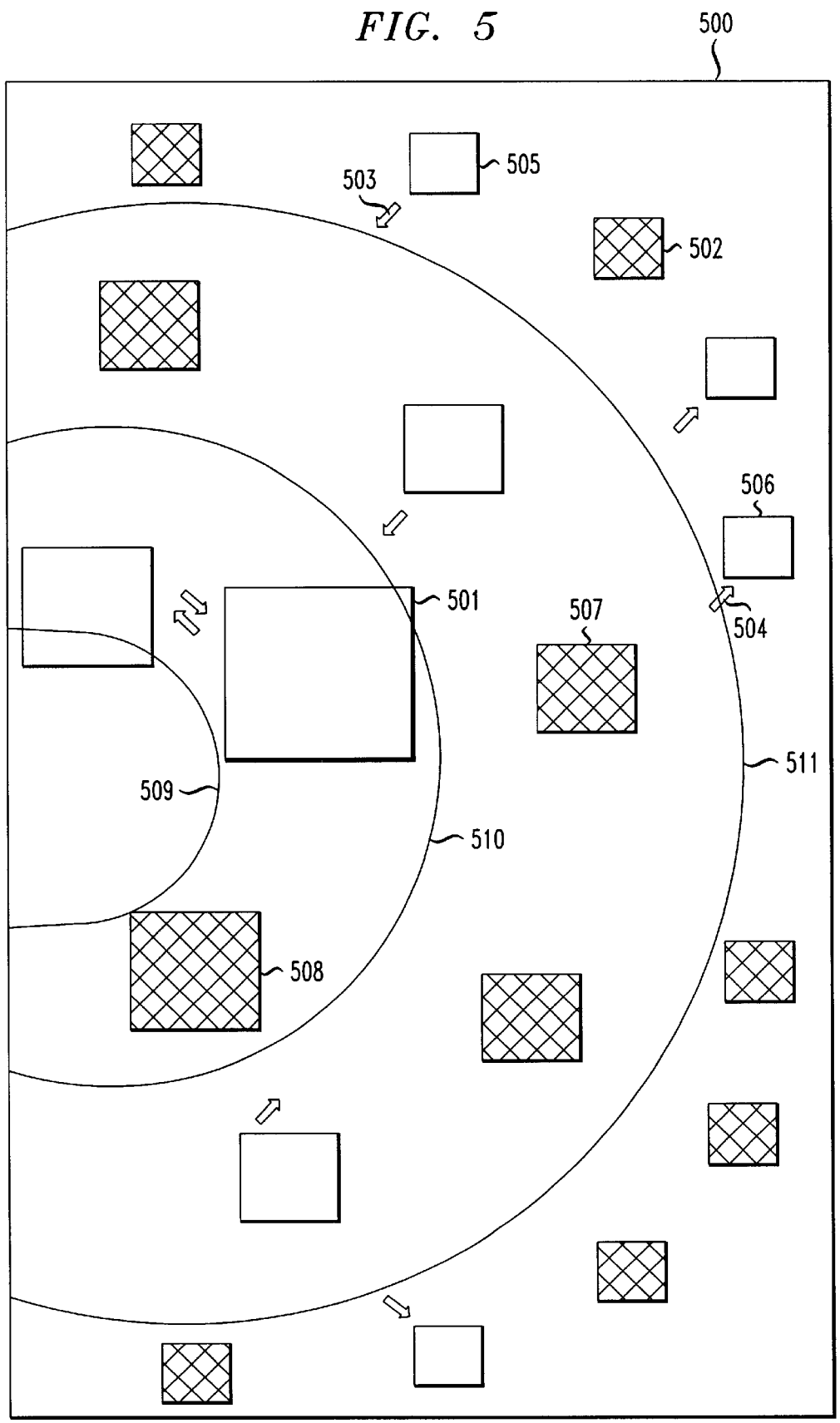
FIG. 5 shows an embodiment of a auditorium seating visualization of a clan graph in accordance with the present invention.

In accordance with an embodiment of the present invention, the results of clan analysis are displayed using "auditorium seating visualization." This metaphor is to the arrangement of seating in an auditorium: row upon row curved around a center stage. FIG. 5 shows an embodiment of a site-focussed auditorium seating visualization of a clan graph displayed on the screen of a user computer in accordance with the present invention. Thumbnails of resources (e.g., sites on the WWW) are shown in a viewing area 500 and serve as iconic representations of sites, 501, 502. The auditorium seating visualization is dynamic. By moving the mouse over a site thumbnail, a user switches from a general view of the graph to a view focused around the indicated site. FIG. 5 shows the visualization in the site-focused mode. The thumbnail of the focused site 501 is enlarged, and "out" arrows (e.g., 503) and "in" arrows (e.g., 504) appear on sites (505 and 506, respectively) with which the focused site is linked. Other unlinked sites are darkened e.g., 502, 507 and 508).The concentric arrangement of sites reveal center/periphery distinction and allow sorting within "seating rows" 509, 510 and 511. In this embodiment, centrality is based on the number of 2-clans in which each site participates. Users were found to make mental distinctions between "index sites" and "content sites" and wanted the layout of sites to reflect that dimension. Index sites tend to have many more out-links than in-links, and content sites tend to have more in-links than out-links. An embodiment of the present invention orders sites within each arc 509, 510 and 511 from highest proportion of out-links (at the top) to lowest (at the bottom). Thus, index sites tend to appear at the top and content sites at the bottom. Users can also order sites based on size, number of images or audio files. Dynamic sorts on any of these properties are allowed in accordance with various embodiments of the present invention.

Color-graded bands emphasize the in-link to out-link ratio (or whatever sort property was used) of sites within each semi-circle. For example, in one embodiment, bands are graded from bright red at one end to bright green at the other, with a graduated color change from one end to the other. The colors are equally mixed where in-links and out-links are equal.

The auditorium seating embodiment of the present invention advantageously reveals the fine structure of site-to-site links without producing visual clutter of the sort shown in FIG. 3. In one embodiment, the auditorium view is advantageously linked to the user's browser. Selecting a thumbnail drives the user's browser to display the contents of the selected resource.

In one embodiment, holding down the shift key while a site is in-focus reveals any internal pages of that site that are linked to by other sites in one embodiment. These are pages that the author of the linking site found worthy of special attention. The link text often is more informative in these cases. Thumbnail representations can also reveal a substantial amount of information about sites via graphics, animation, video, audio and text.

The visualization animates between general and site-focused modes. In general mode, none of the sites are shaded and arrows are not displayed. Because transitions between these modes occurred so fast as to flash, one embodiment of the present invention advantageously provides a visual dissolve from one mode to the other in order to remove these irritating flashes.

Early user testing highlighted the necessity of relevance feedback, leading to construction of a new observed clan graph. Users can judge sites as on-topic (good) or off-topic (bad). On-topic sites are added to the original seed set, and off-topic sites are added to a stop list. Thus, users can nudge the graph into a somewhat different area, moving it closer to the ideal topic they have in mind.

In accordance with other embodiments of the present invention, site thumbnails are modified to look like a sheaf of several pieces of paper, thus reminding users that each site represents multiple pages rather than a single object. Users can see the titles of all sites at once, thus getting a quick impression of everything that is available. Users can also see a text label for sites, e.g., the number of in links and out links, to be able to quickly extract and compare summary properties.

Figure 6:
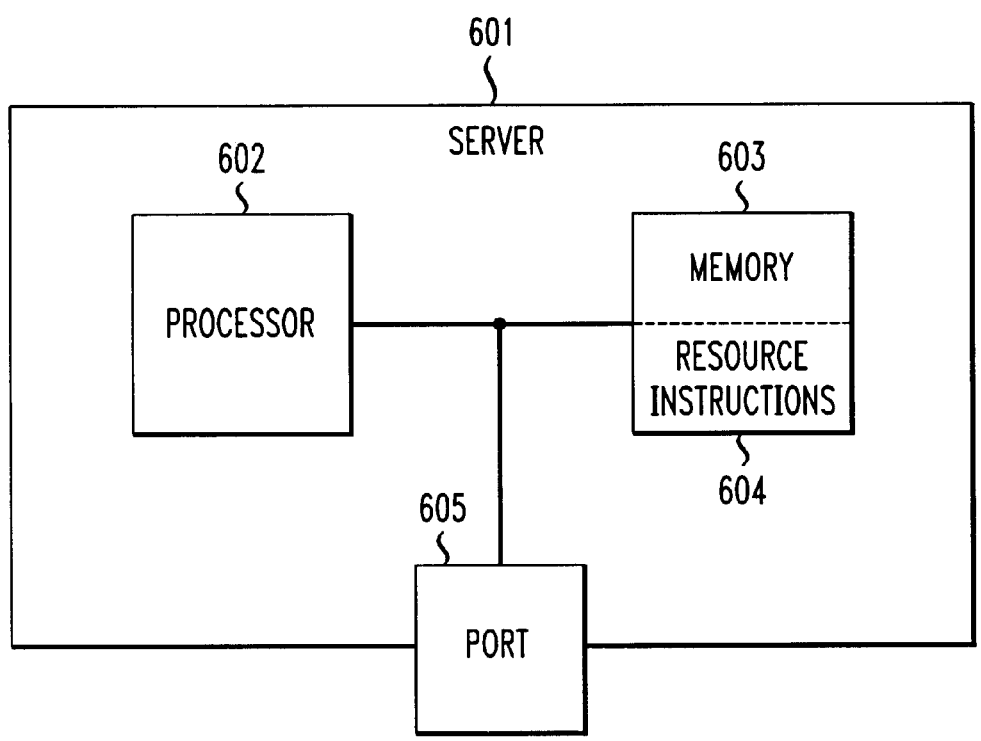
FIG. 6 shows an embodiment of an apparatus in accordance with the present invention.

An embodiment of an apparatus in accordance with the present invention is shown in FIG. 6. A resource server 601 is comprised of a processor 602 and a memory 603 that stores resource instructions 604 adapted to be executed by the processor 602 to receive a set of seed resources S, and identify discovered resources that are in a NK clan graph with respect to the set of seed resources. As described above, an NK clan graph is the set of all resources that are in an N clan with at least K seeds. An N clan is a subgraph G of a hyperlinked collection of resources C where every node in G is connected to every other node in G by a path of length N or less, and the connecting paths traverse only nodes in the subgraph G. This last requirement ensures that any node traversed by a connecting path is also a member of G. Resource instructions also are adapted to be executed by processor 602 to add discovered resources D to the set of seed resources S.

Processor 602 is coupled to memory 603. Examples of processor 602 include a general purpose microprocessor, such as the Intel Pentium 133 MHz processor, and an Application Specific Integrated Circuit, which embodies at least part of instructions 604. Examples of memory include random access memory (RAM), a hard disk, and a combination thereof. In one embodiment, resource server 601 further comprises a port 606 adapted to be coupled to a network 606. Port 606 is coupled to memory 603 and processor 602.

The present invention is useful in identifying, collecting and meaningfully presenting related information to a user. The present invention has special relevance for entertainment. Many television shows like X-Files, Babylon 5, Roar, Highlander, and The Simpsons, and musical artists such as Bob Dylan, The Grateful Dead, and The Beatles have significant coverage on the WWW. The relevant production company or recording company usually maintains an official site that is rich in content, including discographies of episode guides, images, sound clips, and video clips. There are many devoted fans who care enough to create web pages devoted to "their" show or artist. The fan sites gradually tend to cover all aspects of the topic. For musicians, there are sites dedicated to influences and related artists, lyrics and chords, bootlegs, and critical analysis. For television shows, there are bio sites for the stars and fan fiction repositories. More generally, there are chat sites, FAQ sites, interview sites, and index sites. We have found that these fan-related topics generally lead to the best collections. The graphs are large, densely connected, and show interesting structural differentiation of sites (e.g., official sites are sinks, index sites are source). This is therefore an ideal application for the present invention.

Although several embodiments are specifically illustrated and described herein, it will be appreciated that modifications and variations of the present invention are covered by the above teachings and are within the purview of the appended claims without departing from the spirit and intended scope of the invention.

What is claimed is:

1. A method for selecting resources from a hyperlinked collection of resources C, comprising the steps of:
    a. receiving a set of seed resources S;
    b. identifying a set of discovered resources D, such that each resource in D is in a NK clan graph in relationship with respect to the set of seed resources, an NK clan graph being the set of all resources that are in an N clan in relationship with at least K seeds, an N clan being a subgraph G of the hyperlinked collection of resources C such that every node in G is connected to every other node in G by a path of length N or less, and the connecting paths traverse only nodes in the subgraph G; and
    c. adding the set of discovered resources D to the set of seed resources S.

2. The method of claim 1, wherein identifying the set of discovered resources includes the steps of:
    a. fetching the content of each seed resource R in S;
    b. adding to a candidate set CS each resource CR to which any seed resource R links;
    c. determining a score for each candidate resource CR in CS;
    d. removing a highest scored candidate CRH from CS;
    e. fetching the content of CRH;
    f. adding to CS each resource to which CRH links
    g. adding CRH to G;
    h. repeating steps a through g until either CS is empty or no resource in CS has a score that is above a specified threshold or G contains a predetermined maximum number of resources.

3. The method of claim 2, wherein determining a score for each candidate resource CR in CS includes the step of counting the number of seed resources to which CR is linked by paths of length 1 or 2.

4. The method of claim 2, wherein a candidate resource includes pages, and wherein fetching the content of CRH includes fetching pages from the resource until an index page of the resource is fetched.

5. The method of claim 4, wherein fetching the index page of the resource includes the step of analyzing the title of the page.

6. The method of claim 4, wherein fetching the index page of the resource includes the step of calculating a ratio of the number of external links in the page to the size of the page.

7. The method of claim 4, wherein fetching the index page of the resource includes the step of determining the number of external links of the page.

8. The method of claim 4, wherein fetching the index page of the resource includes the step of determining if the page contains at least r instances of at least s terms from the group of: link, links, page, pages, resource, resources, web and internet, where r and s are integers.

9. The method of claim 2, wherein a candidate resource includes pages, and wherein fetching the content of CRH includes fetching at least p(min) pages from a resource and no more than p(max) pages from a resource, p(min) and p(max) being integers such that p(min) is less than or equal to p(max).

10. The method of claim 2, wherein fetching the content of CRH includes the steps of:
    a. fetching at least p(min) pages;
    b. continuing to fetch pages until a fetched page is identified as an index page; and
    c. stopping to fetch pages when the number of fetched pages is equal to p(max).

11. The method of claim 1, further comprising the step of determining properties of subgraph G.

12. The method of claim 11 wherein determining the properties of subgraph G includes the step of determining the number of in-links I and out-links O of each resource in G, I and O being integers.

13. The method of claim 11, wherein determining the properties of subgraph G includes the steps of:
    a. identifying a type t of each internal link of a resource in G;
    b. determining a number N(t) of each type t of internal link; and
    c. storing the number N(t) of each type of link correlated with the resource.

14. The claim of 13, wherein the type t of an internal link is one from the group of: audio, video, animation, text, hypertext, graphic, and executable.

15. The method of claim 11, wherein the determining the properties of subgraph G includes the step of determining a number Q of N clans in G of which a resource in G is a member.

16. The method of claim 1, further comprising the step of displaying resources in G.

17. The method of claim 16, wherein a resource in G is displayed as a thumbnail graphic.

18. The method of claim 17, wherein the contents of the resource are displayed when the thumbnail graphic is selected.

19. The method of claim 16, wherein resources related to a particular resource are indicated in response to a request from a user.

20. The method of claim 19, wherein the related resources are indicated by changing the color of thumbnail graphics corresponding to related resources.

21. The method of claim 19, wherein the related resources are indicated by changing the color of the unrelated resources.

22. The method of claim 16, wherein a link direction by which a first resource is related to a second resource is indicated by providing an arrow pointing towards the thumbnail graphic corresponding to the second resource when the first resource is linked to the second resource, and providing an arrow pointing away from the thumbnail graphic corresponding to the second resource when the second resource is linked to the first resource.

23. The method of claim 22, wheerein the link direction of relationships of a first resource is indicated in response to the user request.

24. The method of claim 16, wherein displaying resources in G comprising the steps of:
   a. sorting resources in G in accordance with a first user specified criterion;
   b. displaying at least a portion of the sorted resources such that a highest ranked resources according to the first criterion are shown near a given point on a display, a lowest ranked resources are shown furthest from the point, and intermediately ranked resources are shown therebetween in accordance with their ranking.

25. The method of claim 24, further comprising the steps of:
   a. sorting resources in G in accordance with a second user specified criterion;
   b. displaying at least a portion of the resources such that the highest ranked resources according to the second criterion are shown near a first edge of the display, the least lowest ranked resources are shown near a second edge of the display, and intermediately ranked resources are shown therebetween in accordance with their ranking.

26. The method of claim 24, further comprising the steps of:
   a. sorting resources in G in accordance with a third user specified criterion;
   b. displaying at least a portion of the resources such that the highest ranked resources according to the third criterion are shown in a first color, the lowest ranked resources are shown in a second color, and intermediately ranked resources are shown in colors therebetween in accordance with their ranking.

27. An apparatus for selecting resources from a hyperlinked collection of resources C, comprising:
   a. a processor;
   b. memory that stores instructions adapted to be executed on said processor to receive a set of seed resources S, identify discovered resources that are in a NK clan graph with respect to the set of seed resources,"S," an NK clan graph being the set of all resources that are in an N clan in relationship with at least K seeds, an N clan being a subgraph G of the hyperlinked collection of resources C such that every node in G is connected to every other node in G by a path of length N or less, and the connecting paths traverse only nodes in the subgraph G, and add discovered resources to the set of seed resources S.

28. The apparatus of claim 27, further comprising a port adapted to be coupled to a network, said port coupled to said processor and said memory, and said port adapted to convey a set of seed resources to said processor.

29. A medium that stores instructions adapted to be executed by a processor to perform the steps of:
   a. receiving a set of seed resources S;
   b. identifying a set of discovered resources D, such that each resource in D is in a NK clan graph with respect to the set of seed resources, an NK clan graph being the set of all resources that are in an N clan with at least K seeds, an N clan being a subgraph G of the hyperlinked collection of resources C such that every node in G is connected to every other node in G by a path of length N or less, and the connecting paths traverse only nodes in the subgraph G, where N and K are integers; and
   c. adding the set of discovered resources D to the set of seed resources S.

30. A system for selecting resources from a hyperlinked collection of resources C, comprising:
   a. means for receiving a set of seed resources S;
   b. means for identifying a set of discovered resources D, such that each resource in D is in a NK clan graph with respect to the set of seed resources, an NK clan graph being the set of all resources that are in an N clan with at least K seeds, an N clan being a subgraph G of the hyperlinked collection of resources C such that every node in G is connected to every other node in G by a path of length N or less, and the connecting paths traverse only nodes in the subgraph G, where N and K are integers; and
   c. means for adding the set of discovered resources D to the set of seed resources S.

* * * * *